(12) United States Patent
Kubota et al.

(10) Patent No.: US 7,975,913 B2
(45) Date of Patent: Jul. 12, 2011

(54) DISCERNMENT CARD AND A DISCERNMENT CARD BUSINESS SYSTEM USING THE DISCERNMENT CARD

(75) Inventors: Yoshinori Kubota, Tokyo (JP); Donald G. Rynne, New York, NY (US)

(73) Assignee: Rynne Group, LLC, New York, NY (US)

( * ) Notice: Subject to any disclaimer, the term of this patent is extended or adjusted under 35 U.S.C. 154(b) by 102 days.

(21) Appl. No.: 12/377,743

(22) PCT Filed: Aug. 22, 2007

(86) PCT No.: PCT/US2007/076473
§ 371 (c)(1),
(2), (4) Date: Feb. 17, 2009

(87) PCT Pub. No.: WO2008/024813
PCT Pub. Date: Feb. 28, 2008

(65) Prior Publication Data
US 2010/0176195 A1    Jul. 15, 2010

(30) Foreign Application Priority Data

Aug. 22, 2006  (JP) .................................. 2006-225598
Dec. 18, 2006  (WO) ................... PCT/JP2006/325213

(51) Int. Cl.
*G06K 5/00*    (2006.01)
(52) U.S. Cl. ........ 235/380; 235/375; 235/449; 235/451; 235/492; 235/487; 235/493; 235/494
(58) Field of Classification Search .................. 235/375, 235/380, 451, 454, 457, 492, 487, 494
See application file for complete search history.

(56) References Cited

U.S. PATENT DOCUMENTS
3,048,097  A    8/1962  Miller
(Continued)

FOREIGN PATENT DOCUMENTS
DE    3130213    2/1983
(Continued)

OTHER PUBLICATIONS

"Bar Code 1", 2-Dimensional Bar Code Page, available at http://www.adams1.com/pub/russadam/stack.html, printed on Aug. 1, 2007.
(Continued)

*Primary Examiner* — Thien M. Le
*Assistant Examiner* — Tuyen K Vo
(74) *Attorney, Agent, or Firm* — Cowan, Liebowitz & Latman, PC

(57) ABSTRACT

This invention is related to a discernment card which is resistant to bending and high heat, and capable of preventing unauthorized copying of recorded identity information leakage of personal information and deletion of identity information, and to a discernment card business system for preventing unauthorized use of identity information. The discernment card (1) comprises a card main body (10) integrally formed by a high strength alloy and at least one identity information recording portion (20) comprising specific identity information inscribed on the card main body, wherein plural cells (30) are inscribed at predetermined positions of identity information recording portion of the card main body and specific identity information of the identity information recording portion is specified by one or more of inscribed depth, inscribed width and inscribed shape of the cells. The discernment card can be used in the discernment card business system to accomplish a transaction such as an Automated-Teller-Machine (ATM) or a social security-related transaction.

31 Claims, 6 Drawing Sheets

U.S. PATENT DOCUMENTS

| | | | |
|---|---|---|---|
| 3,468,046 | A | 9/1969 | Makishima |
| 3,705,294 | A | 12/1972 | Kuehnle et al. |
| 4,058,839 | A | 11/1977 | Darjany |
| 4,222,516 | A | 9/1980 | Badet et al. |
| 4,398,985 | A | 8/1983 | Eagon et al. |
| 4,417,138 | A | 11/1983 | Pfeiffer |
| 4,434,361 | A | 2/1984 | Meinguss et al. |
| 4,542,288 | A | 9/1985 | Drexler |
| 4,544,835 | A | 10/1985 | Drexler |
| 4,588,212 | A | 5/1986 | Castagnoli |
| 4,620,727 | A | 11/1986 | Stockburger et al. |
| 4,677,285 | A | 6/1987 | Taniguchi |
| 4,707,594 | A | 11/1987 | Roth |
| 4,725,924 | A | 2/1988 | Juan |
| 4,745,267 | A | 5/1988 | Davis et al. |
| 4,747,620 | A | 5/1988 | Kay et al. |
| 4,754,128 | A | 6/1988 | Takeda et al. |
| 4,786,791 | A | 11/1988 | Hodama |
| 4,788,102 | A | 11/1988 | Koning et al. |
| 4,849,618 | A | 7/1989 | Namikawa et al. |
| 4,876,441 | A | 10/1989 | Hara et al. |
| 4,897,533 | A | 1/1990 | Lyszczarz |
| 4,900,111 | A | 2/1990 | D'Amato et al. |
| 4,918,631 | A | 4/1990 | Hara et al. |
| 4,923,471 | A | 5/1990 | Morgan |
| 4,929,820 | A | 5/1990 | Jespersen |
| 4,938,830 | A | 7/1990 | Cannistra |
| 5,059,776 | A | 10/1991 | Antes |
| 5,279,019 | A | 1/1994 | Knickle |
| 5,291,006 | A | 3/1994 | Nishiguma et al. |
| 5,299,940 | A | 4/1994 | Uenaka et al. |
| 5,300,169 | A | 4/1994 | Tahara |
| 5,309,840 | A | 5/1994 | Takamura et al. |
| 5,393,967 | A | 2/1995 | Rice et al. |
| 5,421,618 | A | 6/1995 | Okazaki et al. |
| 5,437,897 | A | 8/1995 | Tanaka et al. |
| 5,442,433 | A | 8/1995 | Hoshino et al. |
| 5,444,225 | A | 8/1995 | Takahashi et al. |
| 5,451,763 | A | 9/1995 | Pickett et al. |
| 5,492,370 | A | 2/1996 | Chatwin et al. |
| 5,525,400 | A | 6/1996 | Manser et al. |
| 5,559,370 | A | 9/1996 | Berney |
| 5,569,898 | A | 10/1996 | Fisher et al. |
| 5,582,103 | A | 12/1996 | Tanaka et al. |
| 5,602,378 | A | 2/1997 | Vaarala |
| 5,608,203 | A | 3/1997 | Finkelstein et al. |
| 5,608,712 | A | 3/1997 | Rilum et al. |
| 5,629,070 | A | 5/1997 | Korth |
| 5,746,451 | A | 5/1998 | Weyer |
| 5,793,502 | A | 8/1998 | Bianco et al. |
| 5,839,763 | A | 11/1998 | McCannel |
| 5,844,230 | A | 12/1998 | Lalonde |
| 5,856,070 | A | 1/1999 | Korth |
| 5,877,941 | A | 3/1999 | Ryu |
| 5,928,788 | A | 7/1999 | Riedl |
| 5,944,356 | A | 8/1999 | Bergmann et al. |
| RE36,356 | E | 10/1999 | Gloton et al. |
| 5,986,550 | A | 11/1999 | Rapaport et al. |
| 5,988,503 | A | 11/1999 | Kuo |
| 6,006,456 | A | 12/1999 | Hiromachi et al. |
| 6,025,283 | A | 2/2000 | Roberts |
| 6,121,069 | A | 9/2000 | Boyko et al. |
| 6,146,741 | A | 11/2000 | Ogawa et al. |
| 6,164,548 | A | 12/2000 | Curiel |
| 6,179,338 | B1 | 1/2001 | Bergmann et al. |
| 6,250,555 | B1 | 6/2001 | Inamoto |
| 6,294,241 | B1 | 9/2001 | Kaule et al. |
| 6,328,342 | B1 | 12/2001 | Belousov et al. |
| 6,337,752 | B1 | 1/2002 | Heckenkamp et al. |
| 6,373,965 | B1 | 4/2002 | Liang |
| 6,382,506 | B1 | 5/2002 | Van Der Valk |
| 6,382,677 | B1 | 5/2002 | Kaule et al. |
| 6,467,687 | B1 | 10/2002 | Hill et al. |
| 6,471,127 | B2 | 10/2002 | Pentz et al. |
| 6,471,128 | B1 | 10/2002 | Corcoran et al. |
| 6,491,782 | B1 | 12/2002 | Jaynes |
| 6,492,717 | B1 | 12/2002 | Gore et al. |
| 6,502,757 | B1 * | 1/2003 | Iwamoto et al. ............... 235/494 |
| 6,533,180 | B1 | 3/2003 | Wood |
| 6,644,551 | B2 | 11/2003 | Clayman et al. |
| 6,655,719 | B1 | 12/2003 | Curiel |
| 6,715,797 | B2 | 4/2004 | Curiel |
| 6,734,887 | B2 | 5/2004 | Field |
| 6,927,885 | B2 | 8/2005 | Staub et al. |
| 6,942,156 | B2 | 9/2005 | Ohta et al. |
| 6,952,950 | B2 | 10/2005 | Doe et al. |
| 6,976,627 | B1 | 12/2005 | Culp et al. |
| 7,207,494 | B2 | 4/2007 | Theodossiou et al. |
| 7,225,991 | B2 | 6/2007 | Jones et al. |
| 7,461,791 | B2 | 12/2008 | Keshura |
| 2002/0070279 | A1 | 6/2002 | Zausner |
| 2002/0117846 | A1 | 8/2002 | Kaule et al. |
| 2002/0130186 | A1 | 9/2002 | Lasch et al. |
| 2002/0145049 | A1 | 10/2002 | Lasch et al. |
| 2002/0185561 | A1 | 12/2002 | Koike et al. |
| 2003/0024995 | A1 | 2/2003 | Conner et al. |
| 2003/0047253 | A1 | 3/2003 | Robinson et al. |
| 2003/0085721 | A1 | 5/2003 | Eldridge et al. |
| 2003/0102541 | A1 | 6/2003 | Gore et al. |
| 2003/0150762 | A1 | 8/2003 | Biller |
| 2003/0202151 | A1 | 10/2003 | Hinata |
| 2003/0220804 | A1 * | 11/2003 | Wilson et al. ..................... 705/1 |
| 2004/0026518 | A1 | 2/2004 | Kudo et al. |
| 2004/0061725 | A1 | 4/2004 | Usuda et al. |
| 2004/0121257 | A1 | 6/2004 | Kaminsky et al. |
| 2004/0159709 | A1 | 8/2004 | Ohta et al. |
| 2004/0217178 | A1 | 11/2004 | Lasch et al. |
| 2005/0012326 | A1 | 1/2005 | Keller et al. |
| 2005/0109850 | A1 * | 5/2005 | Jones ........................... 235/487 |
| 2005/0178827 | A1 | 8/2005 | Shatford |
| 2005/0194453 | A1 | 9/2005 | Conner et al. |
| 2005/0211784 | A1 * | 9/2005 | Justin ............................ 235/492 |
| 2005/0247794 | A1 * | 11/2005 | Jones et al. ................... 235/487 |
| 2006/0001440 | A1 | 1/2006 | Martens et al. |
| 2006/0102729 | A1 | 5/2006 | Gandel et al. |
| 2006/0124753 | A1 | 6/2006 | Scholz et al. |
| 2006/0161787 | A1 | 7/2006 | Kikuchi et al. |
| 2006/0214008 | A1 | 9/2006 | Asami et al. |
| 2007/0195834 | A1 | 8/2007 | Tanaka et al. |

FOREIGN PATENT DOCUMENTS

| | | |
|---|---|---|
| EP | 0159828 | 10/1985 |
| EP | 0298687 | 1/1989 |
| EP | 0533448 | 3/1993 |
| EP | 0552047 | 7/1993 |
| GB | 1115953 | 6/1968 |
| JP | 60-178590 | 9/1985 |
| JP | 03-243201 | 10/1991 |
| JP | 03-266695 | 11/1991 |
| JP | 05-016581 | 1/1993 |
| JP | 05-073738 | 3/1993 |
| JP | 06-270581 | 9/1994 |
| JP | 08-077599 | 3/1996 |
| JP | 08-153323 | 6/1996 |
| JP | 10-035158 | 2/1998 |
| JP | 2001-121852 | 5/2001 |
| JP | 2001-250099 | 9/2001 |
| JP | 2001-290779 | 10/2001 |
| JP | 2002-041990 | 2/2002 |
| JP | 2003-154778 | 5/2003 |
| JP | 2004-038852 | 2/2004 |
| JP | 2004-066299 | 3/2004 |
| JP | 2005-353255 | 12/2005 |
| JP | 2006-183104 | 7/2006 |
| JP | 2006-183111 | 7/2006 |
| JP | 2006-201895 | 8/2006 |
| JP | 2007-258691 | 10/2007 |
| WO | 2004/063977 | 7/2004 |
| WO | 2006/081385 | 8/2006 |

OTHER PUBLICATIONS

"Credit-card appeal: a new look, smell", available at http://www.post-gazette.com/pg/06319/738510-28.stm, printed on Jul. 11, 2007.

"Centurion Card", Wikipedia, the free encyclopedia, available at http://en.wikipedia.org/wiki/Centurion_Card, printed Jul. 11, 2007.

"Titanium 6-4", Metal Suppliers Online: Material Property data, available at http://www.suppliersonline.com/propertypages/6-4.asp, printed on Aug. 2, 2007.

"Metal Tag Embossing & Indenting", Identification Technologies, Inc., available at http://www.identi-tech.com/embossing.php, printed on Aug. 2, 2007.

"Social Security Number Verification Service (SSNVS): Instructions and Information", Social Security Online, available at http://www.ssa.gov/employer/ssnv.htm, printed on Aug. 7, 2007.

"Social Security Number Verification", USA Trace.com, available at http://www.usatrace.com/ssnverification.html, printed on Aug. 7, 2007.

"Breaking Things: 3D Barcode," Rob Lycett, Smart Design, COEDD, Huddersfield University, 2004-2006, available at http://www.da-n.co.uk/blogs/lycett/2004/10/3d-barcode.html, printed on May 18, 2007.

"Dot Peen (Indent) Marking", Mecco Marking & Traceability, available at http://www.mecco.com/indent_bumpy_bar_code.html, printed on May 21, 2007.

"How Credit Cards Work", Howstuffworks, available at http://money.howstuffworks.com/credit-card.htm/printable, printed on Dec. 10, 2007.

"ISO Magnetic Stripe Card Standards", available at http://www.cyberd.co.uk/support/technotes/isocards.htm, printed on Dec. 10, 2007.

"How ATMs Work", Howstuffworks, available at http://www.howstufworks.com/atm.htm/printable, printed on Dec. 10, 2007.

"Everything you ever wanted to know about CC's", available at http://euro.ecom.cmu.edu/resources/elibrary/everycc.htm, printed on Aug. 2, 2007.

"HALCON 7.0: A Milestone of Machine Vision Software", MVTec Press Release, available at http://www.mvtec.com/press/2003-08-22/news-halcon70-text-en.html, printed on Mar. 30, 2007.

"Barcodes—2D & 3D," Machinery Automation & Robotics, available at http://www.machineryautomation.com.au/automation-technology/barcodes.html, printed on Mar. 30, 2007.

"Smart Card Technology", Government Smart Card Handbook, U.S. General Services Administration, Chapter 2, pp. 15-72 (Feb. 2004), available at http://www.idmanagement.gov/smartcard/information/smartcardhandbook.pdf.

"Appendix B—Survey Of Federal Smart Card Projects", Government Smart Card Handbook, U.S. General Services Administration, Appendix B, pp. B-1-B-10 (Feb. 2004), available at http://www.idmanagement.gov/smartcard/information/smartcardhandbook.pdf.

"Government Benefits from SSN Use but Could Provide Better Safeguards", Social Security Numbers, GAO: Report to Congressional Requesters, United States General Accounting Office (May 2002).

"Government and Other Uses of the Social Security Number are Widespread", Social Security, Testimony Before the Subcommittee on Government Management, Information, and Technology, Committee on Government Reform, House of Representatives; Statement of Barbara D. Bovbjerg, Associate Director; Education, Workforce, and Income Security Issues; Health, Education, and Human Services Division (May 18, 2000).

"Social Security Number Verification Service (SSNVS): Additional Verification Options", Social Security Online, available at http://www.ssa.gov/employer/ssnvadditional.htm, printed on Aug. 7, 2007.

"What is Bumby Bar Code?", Mecco Marking & Traceability, available at http://www.mecco.com/bumpy_bar_code.html, printed on May 21, 2007.

"Molding and Casting Bumpy Bar Codes", Mecco Marking & Traceability, available at http://www.mecco.com/molded_cast_bbc.html, printed on May 21, 2007.

"Hot Stamping and Vacuum Form", Mecco Marking & Traceability, available at http://www.mecco.com/hot_stamping_bbc.html, printed on May 21, 2007.

"Embossing", Mecco Marking & Traceability, available at http://www.mecco.com/embossed.html, printed on May 21, 2007.

"Laser Engraving", Mecco Marking & Traceability, available at http://www.mecco.com/laser_engraving.html, printed on May 21, 2007.

"Anatomy of Credit Card Numbers," Michael Gilleland, Merriam Park Software, available at hhttp://merriampark.com/anatomycc.htm, printed on Aug. 2, 2007.

"Street Level Credit Card Fraud," Brian Krebs on Computer Security, Washington Post, available at http://blog.washingtonpost.com/securityfix/2006/03/street_level_credit_card_fraud.html, printed on Aug. 2, 2007.

"Plastic Payments: Trends in Credit Card Fraud," Keith Slotter, CPA, FBI Publications—Law Enforcement Bulletin—Jun. 1997 Issue, available at http://www.fbi.gov/publications/leb/1997/june971.htm, printed on Aug. 2, 2007.

Some of the above references were cited in the International Search Report of PCT/JP2006/325213, dated Mar. 20, 2007, which is enclosed with a partial English translation.

Some of the above references were cited in the Office Action of U.S. Appl. No. 11/661,766, dated Sep. 3, 2009, which is enclosed).

IBM Technical Disclosure Bulletin, Apr. 1986, vol. 28, pp. 4723-4725 (cited in the application corresponding to Publication No. 20060102729, reference is not enclosed).

www.saltlakesilver.com, Titanium ring, titanium wedding bands, silver rings, sterling silver rings, wedding bands; pp. 1-2. (cited in application corresponding to Publication No. 20060102729; reference is not enclosed).

www.amazon.com, price search for "silver ring", Jan. 18, 2007, pp. 1-4 (cited in application corresponding to Publication No. 20060102729; this reference is not enclosed).

www.amazon.com, price search for "titanium ring", Jan. 18, 2007, pp. 1-4 (cited in application corresponding to Publication No. 20060102729; this reference is not enclosed).

* cited by examiner

DISCERNMENT CARD AND A DISCERNMENT CARD BUSINESS SYSTEM USING THE DISCERNMENT CARD

FIELD OF THE INVENTION

The present invention relates to a discernment card and more particularly to a discernment card comprising a card main body integrally formed of a high strength alloy and having an identity information recording portion. Furthermore, the present invention also relates to a discernment card business system which uses the discernment card. In addition, according to the present invention, the discernment card includes a card in the form of a thin bar or plate, an ID card, a Social Security Card, a transactional card and other types of cards to confirm the identity of an owner and/or the person to whom the card is issued generally, in addition to use of the discernment card with an Automated-Teller Machine (hereinafter called as "ATM") or credit settlement system.

Further, the uses of the card include not only transactions between banks and card owners, and credit settlement transactions but also to confirm the identity of a user using a Social Security card for social welfare and other services.

BACKGROUND OF THE INVENTION

Conventionally, for example, a magnetic body domain is comprised on one surface side of a card main body formed of a resin material such as chloroethylene resin or PET (a polyethylene terephthalate) resin as a discernment card employed by ATM and credit settlement systems. Discernment cards which record identity information magnetically in the magnetic body domain according to an appointed standard are known. In addition, one example of such a discernment card is disclosed by Japanese Patent Laid-Open No. 2003-154778.

In such a conventional discernment card, there was a problem that the discernment card was easily damaged or bent. For example, resin materials used are subject to softening upon exposure to heat such that a resin card, when exposed to heat, is easily deformed or damaged.

Furthermore, in use of such a discernment card, ATM and credit settlement machines cannot accept or recognize a damaged discernment card, so that an owner of a damaged discernment card cannot be identified and a new discernment card must be re-issued, which is a very troublesome procedure.

Thus, a discernment card that is formed by means of a metal material has been tried. However, a metallic discernment card can be troublesome for an owner carrying the card because of the increased weight, for example in the event that an iron material is used. In addition, with an aluminum material, the weight of the card may be improved, however, weakness against bending and heat may not be improved.

Furthermore, in a conventional discernment card, identity information is recorded by means of magnetism, according to an appointed public standard, in a magnetic body domain of a magnetic strip on one surface side of the card main body. In a conventional ATM or credit settlement system, by reading the identity information of the card in a magnetic reader, and accessing a database of a host computer, confirmation of the owner of the card is possible.

Since a standard of the magnetic arrangement is published, identity information can be read by means of a commercial magnetic reader in addition to conventional ATM and credit settlement machines.

Against the intentions of an owner of a discernment card, identity information can thus be read by such a commercial magnetic reader, and the read identity information then copied to other discernment cards, in a criminal act referred to as so-called "skimming" or making an illegal copy. It becomes a social problem that the owner and the discernment card company are seriously damaged because of the illegal use of such an illegally copied discernment card by a person other than the owner. In addition, there is the problem that personal information can be leaked out by means of skimming since the personal information has been included in identity information of the conventional discernment card.

Furthermore, there exists a problem wherein identity information is lost in cases that a discernment card is exposed to a strong magnetic field such as, for example, a magnet or a television set because the information was magnetically recorded in the magnetic strip.

Further, in the U.S.A., the US Social Security Administration (SSA) issues a social security number to citizens and certain residents as personal identification information with regard to taxation, receipt of benefits, etc. In addition, a social security card having the social security number is issued to each person obtaining a number. The name of the card owner is mentioned on the social security card face side with characters of the alphabet, and the social security number is printed with numeral characters.

In receiving or applying for social security benefits at a social security agency as one example of a specific use of a social security number, a person, such as an applicant for benefits, shows the social security card to the agency personnel. The personal information of the person is obtained or confirmed using the social security number printed on the social security card and thus the person can be considered and/or accepted for the social security benefits requested. In addition, because a person's social security number remains unchanged for life, it is employed as an identification card for verifying the identity of the person.

Since the social security card not only contains the social security number but also the name of the card owner, this information is easy to memorize and thus a third party can steal the information and use it illegally, which occurs frequently. As a result, serious economic losses are incurred annually and this becomes a serious problem.

[Patent document 1] a Japanese Patent Laid-Open No. 2003-154778 Gazette

SUMMARY OF THE INVENTION

It is an object of the present invention to provide a discernment card that is strong, is not damaged by bending or high heat, and from which recorded identity information is not copied falsely, personal information is not leaked, and identity information is not erased. Furthermore, it is an object of the present invention to provide a discernment card business system which uses the discernment card, and which prevents illegal use of identity information.

According to one aspect of the present invention, a discernment card comprises a card main body integrally formed of a high strength alloy and at least one discernment information recording portion comprised of specific identity information inscribed on the card main body. Plural cells are inscribed at a predetermined position of the card main body in the identity information recording portion. Specific identity information is specified by means of either one of an inscribed depth, an inscribed width and an inscribed shape of the cells or combination thereof.

At the identity information recording portion, the first identity information may be specified by a pattern inscribed in each of the plural cells, the second identity information may be specified by the depth from opening to bottom surface of the cells. The combination of these pieces of information may also specify unique identity information.

According to another aspect of the invention, a trading or transaction system utilizes the aforementioned discernment card. This system comprises a discernment card according to the aforementioned description; a client system for reading specific identity information inscribed in the discernment card; a server system connected with the client system through a network; a data base provided in the server system and having said specific identity information and personal information of the owner of or entity issued the discernment card recorded therein; and a judging portion provided in the server system and matching said specific identity information with records in the data base, wherein the client system reads the specific identity information according to the pattern inscribed in the discernment card and further the judging portion identifies the owner of or entity issued the card by checking with the data base in the server system.

According to the present invention, a discernment card is provided which is strong, and is not damaged by bending or exposure to high heat. Further, according to the present invention, recorded identity information cannot be copied falsely, personal information is not leaked, and identity information cannot be erased. Furthermore, the discernment card business system in which the discernment card is employed is prevented from illegal use of the identity information.

Figure 1:
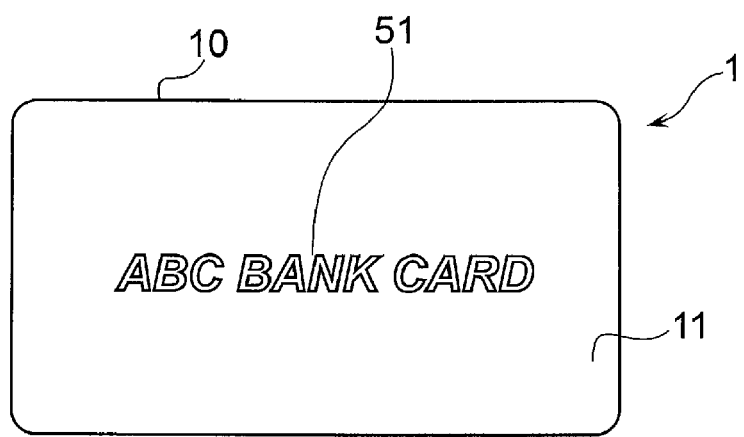
FIG. 1 is a plan view showing a surface of a discernment card when it is used as a cash card or credit card.

DENOTATION OF REFERENCE NUMERALS 1 a discernment card
10 the card main body
20 an identity information recording portion
30 the plural cells which are arranged by the identity information recording portion

DETAILED DESCRIPTION

A discernment card 1 used in the first embodiment of the present invention is described based on the attached drawings as follows.

A discernment card 1 according to the present embodiment is employed mainly by ATMs and credit settlement systems and as a so-called bank card or a credit card or a transactional card.

The discernment card 1 may have physical characteristics as prescribed in the "JISX6301" or the "ISO/IEC7810" standard. In other words, the length of the long side direction of the card (left and right-hand direction in the drawing) is 85.6 mm, the length of the short side direction (up and down direction in the drawing) is 54 mm, and the thickness is in a range between 0.68 mm-0.84 mm.

In addition, the size of the card follows the aforementioned standard since the discernment card 1 is used for ATM and the credit settlement in the present embodiment. However, when used for other purposes having different standards, the size of the card may be adapted to satisfy these standards.

A discernment card 1 is formed from a high strength alloy as one body. For example, the discernment card 1 may be formed from a sheet material comprising a high strength alloy referred to as 6-4 titanium sorted by "JIS H4600, JIS60 class (TAP6400)" or "B265:95a, ASTMGrade5" in a press punching process, to take on a concrete plate shape.

The entire main body 10 of the discernment card 1 is formed by the high strength alloy, and the surface of the card body 10 has optionally a metal evaporation layer on which the metal ions are electrodeposited.

The metal deposition process is freely selectable and matched with the operating environment of the card and consumer demands. Therefore, it is not limited to any particular process. However, an example of a process for applying the metal deposition layer is Physical Vapor Deposition (PVD), which is preferable.

For example, card main body 10 can be colored black, gold, platinum, pink, or blue by such a processing. In addition, even if the coloration produced by the metal evaporation layer on the card surface is rubbed during use of the discernment card 1 or the card surface is washed with a powerful detergent, the coloration is not easily removed.

In addition, the coloration by using the metal evaporation layer provides a solid coloration in the present embodiment. However, the coloration can be accomplished by printing as in a conventional discernment card according to the environment of use of the discernment card 1 and consumer demand.

For example, on one side, surface side 11 of the card main body 10, "ABC BANK CARD" lettering is inscribed by a laser engraver, indicating the issuer of or company associated with the discernment card 1, as shown in FIG. 1.

Surface 11 is inscribed by means of an irradiating laser directed at points of the surface 11 of the card main body 10 so as to form the desired characters.

Since a laser engraver is selectable depending upon the operating environment of the card and consumer demand, it is not limited to any laser engraver in particular. However, for example, it is generally comprised of a displacement device which carries a laser and a focusing carriage, and which can move axially in the Z direction and laterally and longitudinally in the X and the Y directions. It is desirable that the focusing carriage and the displacement device can be moved to arbitrary positions relative to the body 10 by means of computer control. For example, a commercial laser inscriber which can be used for this purpose is an XL-9200 laser inscriber from Universal Engraving System, Inc. (shown at http://www.uesltd.co.jp/product/xl.html or http://www.ulsinc.com/english/laser_systems/product_line/xl9200.html).

In addition, as discernment card information on the surface 11, a desired pattern and the name of the owner of the discernment card 1 may be inscribed in addition to the name of the card issuer or associated company name. Also, discernment card information may be printed so that the discernment card information does not come off easily when the discernment card is used. Or, a seal may be affixed thereto.

Figure 2:
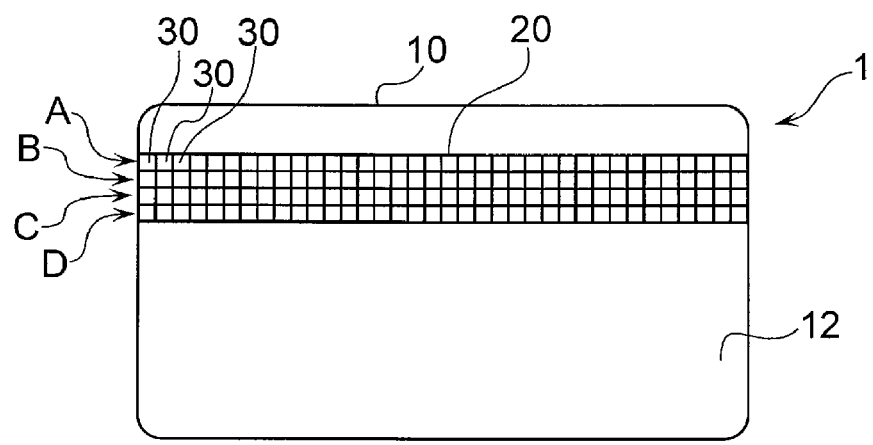
FIG. 2 is a plan view showing the rear surface side of a discernment card when it is used as a cash card or credit card.

On the other hand, on the back side 12 of the card main body 10, for example, at least one identity information recording portion 20 is provided as shown in FIG. 2. Cells (shown as cube-shaped) 30, 30 . . . of the identity information recording portion 20 are introduced and arranged in a grid having a first number of cells extending in the long card direction of the card (A, B, C, D in FIG. 2), and a second number of cells extending in the short card direction.

For example, in the present embodiment, the identity information recording portion 20 is divided into a grid having, in the length direction, 36 cells, and in the width direction 4 cells and thus comprises 144 cells each shaped like a cube. In addition, each cell is arranged without having any gaps between it and its adjacent cells.

Figure 3:
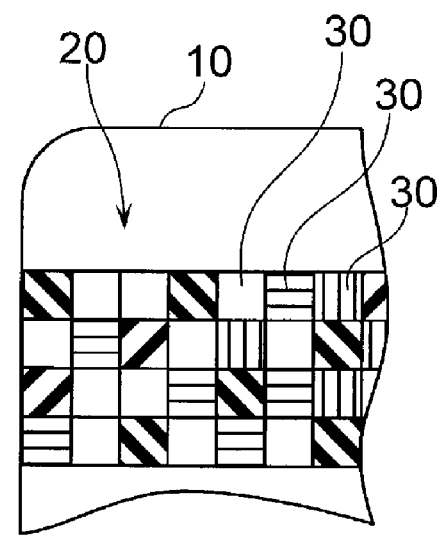
FIG. 3 is a detailed view of a portion of an identity information recording portion of the rear side of the discernment card of FIG. 2.

Plural cells 30, 30 . . . , are formed according to unique, predetermined identity information and are arranged in a grid or matrix as shown in FIG. 3. In particular, the specific predetermined identity information is assigned or associated with the owner of or person issued the discernment card.

In addition, the cell shape adopted in the present embodiment is a quadrangle in cross-section (square, in particular). However, the cell shape cross-section may be any other shape limited only by being recordable as identity information. For example, the shape cross-section may be a polygon such as a triangle or a pentagon, circular, or a combination of polygonal and circular forms such as a polygon having arc-shaped corners.

In addition, as above-mentioned, each cell is arranged in the present embodiment without a gap. However, the cell arrangement is not limited to this and a gap may be established between each cell.

Figure 4:
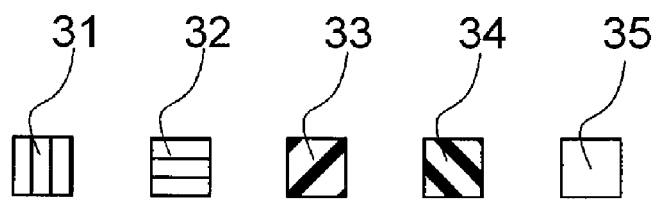
FIG. 4 shows straight line patterns that may be recorded in the identity information recording portion.

In the case shown in FIG. 3, first identity information is inscribed as a straight line pattern at a predetermined angle on the surface of a cell. In the present embodiment, a vertical pattern 31, a horizontal pattern 32, a left diagonal pattern 33, and a right diagonal pattern 34 are adopted as shown in FIG. 4 to define four kinds of the first identity information. In addition, a fifth kind of first identity information corresponds to a lack of any straight line pattern as in cell 35.

Figure 5:
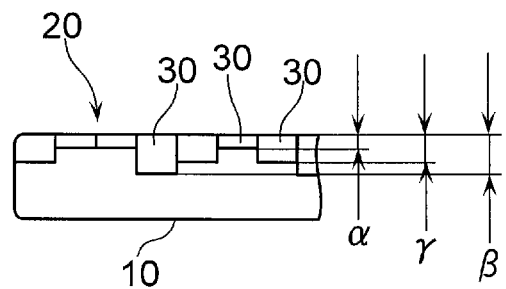
FIG. 5 shows depths of a recorded straight line pattern inscribed in an identity information recording portion.

Furthermore, as the second identity information, the first identity information is inscribed at a predetermined depth. In the present embodiment, three kinds of second identity information are set by means of inscription at a shallow position or depth α, inscription at a deep position or depth β, and inscription at a middle position or depth γ between the shallow position α and the deep position β, as shown in FIG. 5.

In addition, the inscription to obtain the second identity information can be realized by means of an electrical discharge device acting on the main body 10.

Use of an electrical discharge machine does not limit the operating environment of the card and can satisfy consumer demand, since it allows cell shapes and depths to be totally selectable freely. In use, it is desirable that the electrical discharge device non-contact melt the rear surface 12 of card main body 10, with the electrode of the device having the same plane or cross-sectional shape as that desired for the cell shape and being brought close to a desired point of the rear surface 12 of card main body 10, and then being discharged.

In such case, inscription of the cell in the rear surface 12 of the card main body 10 occurs by fusion.

In addition, the inscription of the cell to the different desired depths is realized by bringing the electrode closer, and holding the discharge.

Displacement or positioning and discharge of the electrode may be controlled by a computer.

For example, a commercial electrical discharge device such as PMT-R from Elenix Inc. (shown at http://www.e-lenix.co.jp/hosoana/pmt-r.html) may be employed.

Once a cell of desired shape and depth is inscribed to form the second identity information, a desired pattern can then be further inscribed in the cell formed on the surface 12 to form the first identity information. This inscription can be carried out by a laser engraver in the same way as the characters were inscribed in the surface 11 of the card main body 10.

The laser engraver used for this inscription can be a commercial device of the type previously mentioned herein above.

Figure 6:
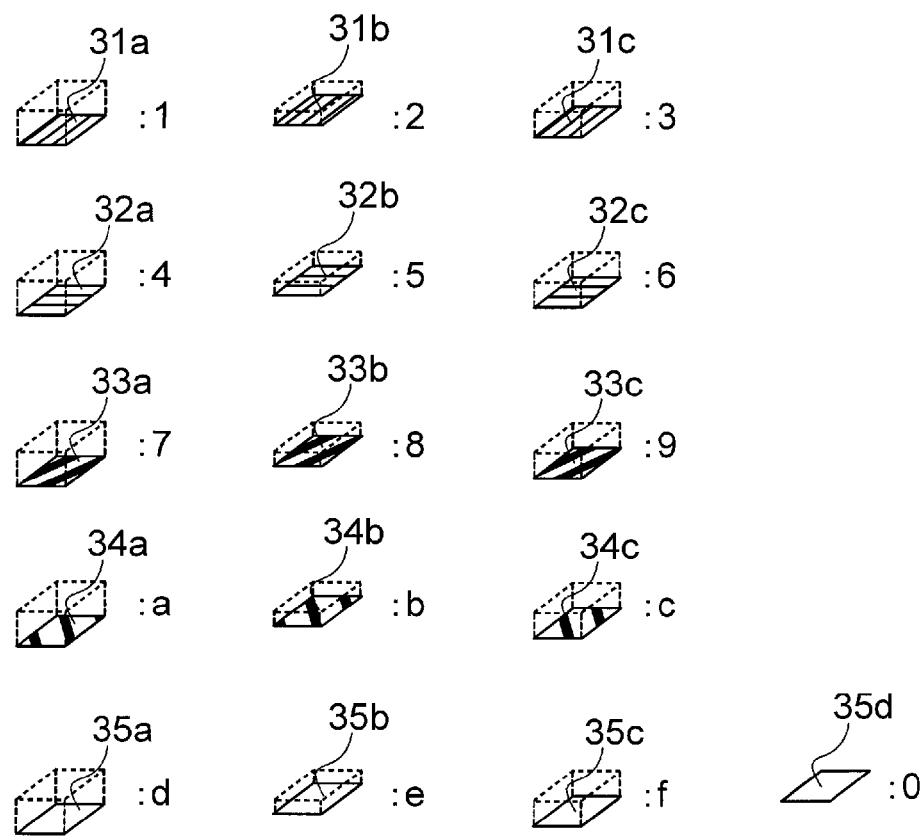
FIG. 6 shows a combination of the first identity information and the second identity information.

By combining the first identity information and the second identity information, (such as combinations of a vertical pattern at deep position 31*a*, a vertical pattern at shallow position 31*b*, a vertical pattern at middle-depth position 31*c*, a horizontal pattern at deep position 32*a*, a horizontal pattern at shallow position 32*b*, a horizontal pattern at middle-depth position, a left oblique pattern at deep position 33*a*, a left oblique pattern at shallow position 33*b*, a left oblique pattern at middle-depth position 33*c*, a right oblique pattern at deep position 34*a*, a right oblique pattern at shallow position 34*b*, a right oblique pattern at middle-depth position 34*c*, no pattern at deep position 35*a*, no pattern at shallow position 35*b*, no pattern at middle-depth position 35*c*), 15 kinds of specific identity information are provided as shown in FIG. 6. Furthermore, in addition to this, a $16^{th}$ kind of specific identity information is obtained by adding cell 35*d* having neither a pattern nor a depth.

In addition, further cases having no depth may be included, including a vertical pattern with no inscription depth, a horizontal pattern with no inscription depth, a left oblique pattern with no inscription depth, and a right oblique pattern with no inscription depth (not shown). When these are added to the 16 kinds of identity information noted above, 20 kinds of specific identity information can be obtained. Accordingly, an arrangement pattern of 144 cells, each comprising one of the 20 kinds of specific identity information, may have 20 to the 144 ($20^{144}$) different combinations.

Identity information of card main body 10 can be read by means of an identity information three dimension laser measuring device.

The three dimension laser measuring device can be freely selected depending upon the reading circumstances of the identity information and consumer selection and thus it is not limited to any particular device. However, for example, it is desirable to employ a laser measuring device which has Z axis displacement control and measures depth based on focal point using a focal position detection sensor, and in which a laser output section irradiates the observation point where depth is to be detected and a receiving section receives laser light reflected back with the face of the observation point at the focal position detection sensor.

In this way, depth of an inscribed cell (the second identity information) is measured with the three dimension laser measuring device, and the pattern of an inscribed cell (the first identity information) is measured. The first identity information and the second identity information can thus be identified individually thereby and then analyzed.

Furthermore, by repeating this process for each cell in turn, all the identity information on the card can be read and analyzed.

A commercial device that is usable as the three dimension laser is an LAF-3DMC from Coms Co., Ltd. (shown at http://coms-corp.co.jp/laf3d/LAF-3D_mc01.htm).

In the present embodiment, an arrangement of cells inscribed in identity information recording portion 20 is divided into a grid of 36 cells in the card lengthwise direction and in four cell steps in a short side direction. However, the number of cell divisions can be freely set according to the inscribed information or a desired pattern rather than be limited to what is shown in FIG. 2. In addition, the size of a cell may be set freely. Also, the pattern to be inscribed comprises a straight line pattern in the present embodiment, but other patterns may be used. For example, it may be a curve pattern.

Furthermore, the identity information recording portion 20 is inscribed in the present embodiment as one zone. However, this can be set freely, for example, it may be inscribed as two zones.

In addition, identity information recording portion 20 is inscribed on the rear side of card main body 10 as one example in the present embodiment, however it is not limited to this, and the identity information recording portion 20 may be provided on the front surface side of the card main body 10.

In addition, the following identity information instead of the specific identity information may be adopted in the present embodiment. For example, specific identity information may be specified by means of one of or a combination of depth of the inscribed cells, width of the inscribed cells, or shape of the inscribed cells, among plural cells inscribed at the appointed position of the card main body. In addition, it may be preferable that specific identity information is specified only by the inscribed pattern on the cells.

Or specific identity information may be specified by means of the depth of the inscribed pattern as the second identity information.

In addition, depth of the inscribed pattern on a cell does not need to be uniform. For example, the pattern inscribed so as to be deep toward one direction can be used as identity information.

As thus described, it is necessary for a laser engraver and a control program of the laser engraver to control appointed identity information in order to inscribe specific identity information in the main body 10 of the discernment card 1 formed with the high strength 6-4 titanium alloy. Therefore, it is extremely difficult to make an unauthorized copy of a genuine discernment card 1 with the same specific identity information as contained on the card 1.

In addition, discernment card 1 formed with 6-4 titanium alloy possesses characteristics of the 6-4 titanium alloy. For example, it is very lightweight, and in comparison with other alloys of a high hardness and thus it is strongly resistant to bending and stresses, and it is not easily melted or deformed in application of heat.

Accordingly, even if an owner carried two discernment cards 1, the weight would not be heavy. Furthermore, in case that a hard object accidentally scrapes the discernment card 1 when the card is being used, the discernment card 1 is not disfigured. Furthermore, the discernment card 1 is not compromised or broken off by means of external force, and if it is subjected to a high temperature environment (such as fire), it is neither damaged nor melted, and it is not deformed. By possessing the aforementioned characteristics, the discernment card 1 can be used for a long time, and it can hold a beautiful surface.

Furthermore, there is no worry that personal information is leaked from the discernment card 1 since personal information is not included in the discernment card 1 in the present embodiment. In addition, there is no concern that the identity information can be erased by exposure to a strong magnetic field since the identity information is not magnetically recorded.

A description is made in a second embodiment of a discernment card business system which employs a discernment card 1 as described above. The constitution and effect of the discernment card 1 are not repeated since they are similar to those of the first embodiment.

Figure 7:
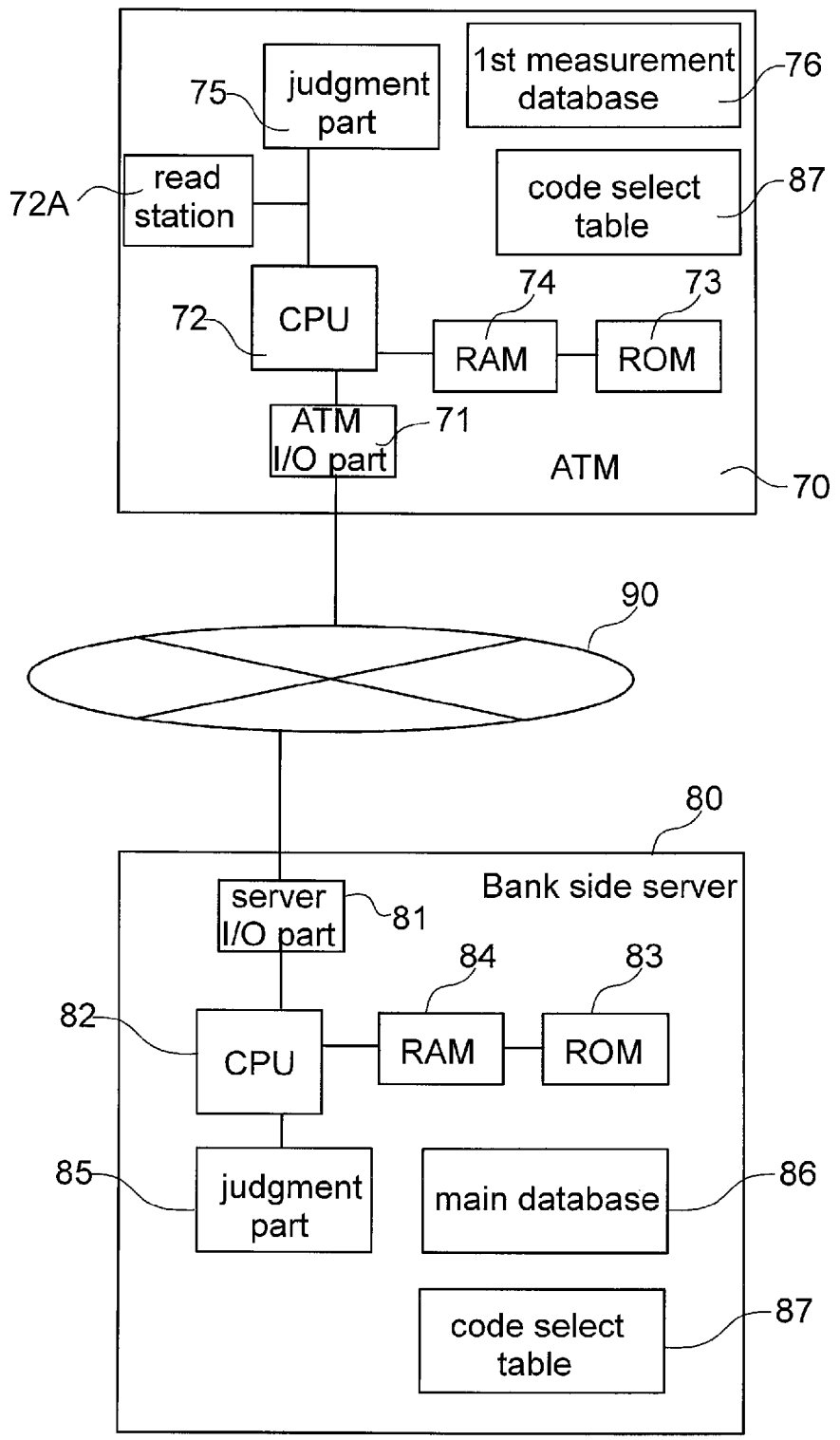
FIG. 7 is a block diagram of the business system which employs a discernment card and uses an ATM and a Bank server.

For example, in the present embodiment, discernment card 1 is employed as a cash card (bank card) for an Automated Teller Machine (ATM) issued by a bank. A client system including an ATM70 is shown in FIG. 7. The bank system includes a server system, shown as a bank side server 80 in FIG. 7. In this case, ATM70 is connected to bank side server 80 by means of a network 90 (a dedicated line network, for example, or the Internet).

Identity information recording portion 20 of discernment card 1 employed as a bank card (cash card) does not record certain information (so-called private information) used in accomplishing conventional ATM transactions. Thus, for example, the account number of the owner or entity issued the card and/or the password of the owner or entity issued the card is not recorded. The only information recorded is limited identity information for linking or associating the discernment card 1 with its owner or the person issued the card.

For example, in the identity information recording portion 20 of discernment card 1, as identity information of the inscribed cells 30, 30 . . . as is explained for the above-mentioned first embodiment, a horizontal pattern at middle-depth position 32*c*, a right oblique pattern at deep position 34*a*, no pattern and no inscription at middle-depth position 35*c*, a left oblique pattern at shallow position 33*b*, no pattern at deep position 35*a*, a vertical pattern at shallow position 31*b* . . . , the cells being arranged with 36 cells in the long direction of card and 4 cells in the short direction of card and thus 144 cells of identity information are arranged.

When discernment card 1 is issued as a bank card, the card is assigned to one of a plurality of groups of cards, the groups being based on the 144 pieces of identity information being divided into pre-determined sets.

In the present embodiment, each group includes cards cells having the same number of (e.g., ten) cell positions with the same corresponding characteristics (e.g., same depths) set. Also, the ten cell positions of each group differ in at least one cell position from the ten cell positions of every other group. For example, cards in a first group may have cell positions 1-10 with their depths correspondingly set, cards in a second group may have cell positions 11-20 with their depths correspondingly set, etc. The depths of the ten cells of a group can be all different, all the same or some can be the same and some can be different.

Thus, for any issued discernment card 1, the depths of the cells (the second identify information) at the ten positions are set based on the predetermined group and the combination of depths (the second identity information) of 144 cells is determined randomly so as not to be the same as any other card.

More particularly, the arrangement pattern of any discernment card 1 is determined at random as per the owner of the card and is allotted so that the arrangement pattern of the unique identity information assigned to the owner of any card 1 is not the same as the arrangement pattern of the unique identity information assigned to the owners of any other discernment card 1.

Therefore, plural owners may not be redundantly registered with the same arrangement pattern.

Furthermore, bank side server 80 comprises server I/O part 81 inputting and outputting identity information from and to ATM 70. In addition, bank side server 80 comprises a CPU 82 connected to I/O part 81.

Furthermore, CPU 82 is connected with a ROM 83 in which a program or programs are stored, a RAM 84 into which the programs stored in the ROM 83 are loaded and for storing identity information to input and output temporarily, a judgment part 85 to determine identity information, a database 86 for recording and managing specific identity information with regard to an individual discernment card, and code select table 87 in which any one of plural coding methods are allotted to the above-mentioned groups.

In this regard, information allotted in the code select table is changed at frequent intervals. For example, it may be changed at every time it is accessed.

Recorded in the main data base 86 is the data associating each owner of a discernment card 1 with predetermined information.

In this case, the predetermined information includes each group and the location and depth and patterns of the ten cell positions assigned to each group. The information also includes the group to which each owner is assigned and the depth (the second identity information) and pattern (the first identity information) of 144 cells of the card 1 issued to each owner. Additionally, recorded and stored in the database for each owner of a card is the information required to realize an ATM transaction (for example, for each owner, the following may be recorded and stored: address and full name, date of birth, account number, password, account balance and record of transaction).

In addition, it is desirable that the main data base 86 be protected by defense means so that access from outside via server I/O portion 81 can be avoided.

For example, main data base 86 can be made accessible only through the internal processing of the bank side server 80 either by hardware or software.

In addition, when discernment card 1 is issued to a new card owner, it is preferable that the private information of the new owner be registered with main data base 86 of bank side server 80 and that it be associated with the owner. It is also desirable at this time that the patterns (first identity information) and depths (second identity information) of the cells of the discernment card 1 being issued be registered with main data base 86.

As can be appreciated, therefore, the first identity information and the second identity information need not be formed in the discernment card 1 at the time of issuance of a card.

In other words, since private information is never recorded in discernment card 1, the discernment card 1 can be prepared with 144 cells of specific identity information (the first identity information and the second identity information) before issuance of the card.

In ATM70, ATM I/O part 71 inputs information from and outputs information, including identity information, to bank side server 80.

In addition, in ATM70, the ATM I/O part 71 is connected to the CPU 72.

Furthermore, in ATM70, ROM 73 is connected with CPU 72 and is loaded with a program or programs and RAM 74 receives the loaded a program or programs from ROM 73 and temporally memorizes identity information to be input and output. A judgment unit 75 judges identity information while a first measurement data base 76 is provided for making a first measurement. A code select table 87 is synchronized with a code select table 87 in the bank side server 80, and a read station 72A reads identity information from the identity information recording portion 20 of the discernment card 1.

The read station 72A includes the aforementioned three dimension laser measuring device.

In addition, the first measuring data base 76 of ATM70 stores the locations or positions and the depths (the second identity information) and patterns (the first identity information) of the ten cells for each of the above discussed groups.

This data of the groups is extracted from data in main data base 86 of the bank side server 80.

Therefore, when relevant data in the main data base 86 is modified, this data is transmitted from the bank side server 80 to the first measuring data base 76. As a result, the data base 76 is always synchronized with the main data base 86 of bank side server 80.

Furthermore, when the data of code select table 87 in bank side server 80 is modified, the modified data is also transmitted from bank side server 80 as initialization information to ATM70. Code select table 87 of ATM70 is thus always synchronized with code select table 87 of bank side server 80.

In addition, generally main data base 86 of bank side server 80, the first measuring data base 76 and code choice table 87 are not publicly accessible.

In such a configuration, when the owner of a discernment card 1 inserts the discernment card 1 in ATM70, ATM70 at first measures the depth (the second identity information) of each cell and the pattern (the first identity information) of each cell of the 144 cells 30,30 . . . inscribed in identity information recording portion 20 of discernment card 1 by means of the three dimension laser measuring device of read station 72A.

Furthermore, the ATM70 compares the measured depths (the second identity information) and patterns of 144 cells with the depths of the groups in the first measuring data base 76 as a first measurement, and thus determines the group to which the card 1 belongs.

Furthermore, ATM70 obtains from code select table 87 the coding method assigned to the determined group.

ATM70 then codes the depths (the second identity information) and patterns (the first identity information) of the 144 cells in accordance with the assigned coding method.

ATM70 then adds data indicating the determined group to the encoded data to form transmitted data and then transmits the same to bank side server 80.

In this regard, for added security, code select table 87 which associates each group with a particular coding method is changed frequently. In addition, at any given time, code select table 87 can have plural coding methods available to be assigned to each group and any one can be selected for encoding a particular group by the code select table. These codes, as above-mentioned, are not publicly accessible.

As a result, it is very difficult to determine the rules as to how to select the coding from outside of the system.

Therefore, even if the transmitted data was somehow stolen during communication between the ATM70 and bank side server 80, the coding of stolen data cannot be determined and the data remains secure.

In summary, therefore, the first identity information, i.e. vertical pattern 31, horizontal pattern 32, left oblique pattern 33, right oblique pattern 34 and no pattern, and the second identity information, i.e. shallow depth inscription $\alpha$, deep depth inscription $\beta$ and said middle-depth inscription $\gamma$, are encoded one by one in accordance with the encoding methods established between ATM70 and bank server 80.

In addition, as previously stated, the encoding methods are not publicly accessible.

Therefore, even if transmitted data is stolen by anyone else, it is very difficult to analyze the data and to re-construct the first identity information and the second identity information.

Furthermore, when plural encoding methods are used and the methods are changed periodically, it is even more difficult to analyze and reconstruct the identity information, making the system more secure.

The transmitted data received from the ATM 70 is received at server I/O.

The transmitted data received at the server I/O 81 is processed by CPU 82 of bank side server 80 carrying out the program or programs loaded from ROM 83 of bank side server 80 to the RAM 84.

In processing at bank side server 80, the information identifying the group is first retrieved from the received transmitted data.

Bank side server 80 uses the code select table 87, and obtains the coding assigned to the retrieved group. Any plural encoding used is determined.

Bank side server 80 then decodes the received transmitted data in accordance with the determined codes and thus retrieves the identity information of the discernment card 1 (depth [the second identity information] and pattern [the first identity information] of each of the 144 cells).

The bank side server 80 then carries out a second measurement procedure.

In the second measurement, the decoded identity information (the arrangement pattern of depth information [the second identity information] and pattern [the first identity information] of the 144 cells) is compared with the data in the main data base 86 and then the judgment part 85 judges whether or not there is data that matches the decoded identity information.

If there is a match, the owner associated with matched data is determined to be the owner of the discernment card 1.

When the owner of the discernment card 1 is determined, the CPU 82 of bank side server 80 can then utilize the stored owner information in the main data base 86 (for example, address and full name of owner, account number, password, account balance) to carry out the ATM transaction.

This operation is similar to the transaction operation employed in conventional ATM transactions.

For example, the CPU 82 of the bank side server 80 carries out a transaction corresponding to the owner's operation of ATM 70 in accordance with the program or programs loaded from the ROM 83 to the RAM 84 of bank side server 80.

One example is, when the owner of the card 1 wishes to withdraw cash, in which case, after authentication of a password and verification of account balance, the ATM 70 is instructed to pay the money corresponding to owner's withdrawal request.

In the present embodiment, bank side server 80 has a judgment part 85 and ATM 70 also has judgment part 75. These judgment parts may be hardware and/or may be software implemented.

According to the transaction system discussed above employing the discernment card 1, private information is not recorded in identity information recording portion 20 of discernment card 1 at all and identity information is merely recorded with depth and pattern data for the card cells.

Therefore, even if discernment card 1 fell into the hands of someone other than the owner of the card, private information of the owner can not be easily read on the basis of information from the discernment card 1.

Therefore, illegal skimming activities using the card can be prevented and since only the rightful owner of the discernment card can use it, the card owner, the bank and the issuing company are protected from serious damage.

Furthermore, even if transmitted data was compromised by entry into the transmission path, since the identity information on the discernment card 1 is encoded with the coding method and can only be decoded at the bank side server 80, illegal use of stolen transmitted data can be prevented.

In addition, even if the account number and other private information of a card owner was illegally obtained separately, this private information is not recorded on the discernment card 1 itself. Thus, a person could not utilize this private information of a card owner to make another discernment card because it provides no clue as to the unique arrangement of identity information assigned to the owner and used on the owner's discernment card.

In addition to this, as is mentioned in the first embodiment of the present invention, it is very difficult to make an illegal copy of a card and thus the card owner, the bank and issuing company will have little likelihood of being seriously damaged by illegal card copies.

In addition, while the case in which the discernment card 1 is used for a transaction between a bank and an ATM has been provided as one example of the use of the discernment card, it is not limited to that use.

For example, it is within the contemplation of the present invention to employ the discernment card 1 to access a basic resident register network and system in which the card is used as an identification card to prove who the person is (personal position and social position) such as a Japanese family register.

As thus described, if even an unexpected event causes serious injury or death to an owner, making it necessary to determine the birth and parentage of the owner, having employed the discernment card 1 as a personal identification card, it becomes operably easy to use the discernment card 1 to determine the birth and parentage of the owner without having to check for DNA or check dental records as was previously required.

The case in which the discernment card 1 is used for such identification as a social security card is explained in the following as a third embodiment.

In this case, discernment card 1 can be similar to the card discussed in the first embodiment.

Figure 8:
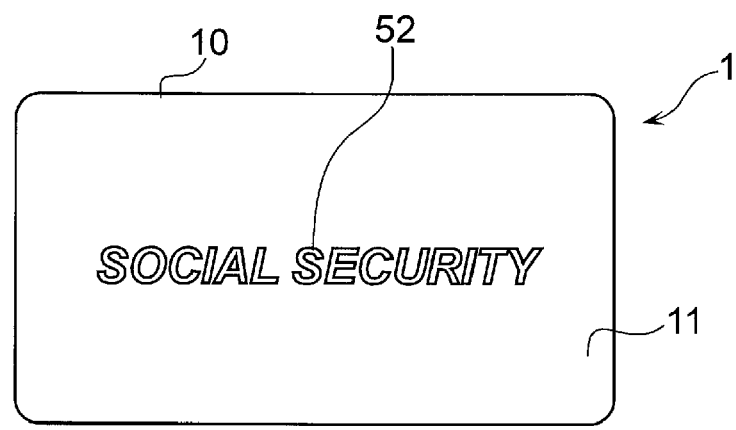
FIG. 8 is a plan view showing a surface of a discernment card when it is used as a social security card.

For example, as shown in FIG. 8, on the face side 11 of card main body 10, the characters "SOCIAL SECURITY" are inscribed by means of a laser engraver as information identifying the discernment card 1 as a social security card.

Figure 9:
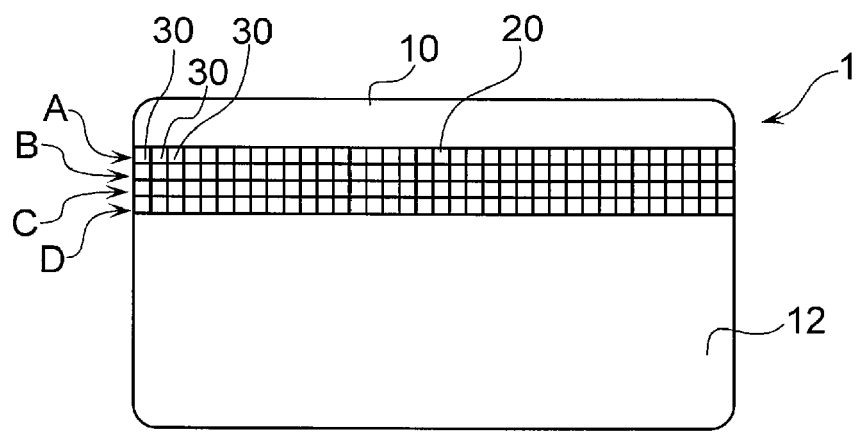
FIG. 9 is a plan view showing the rear surface side of a discernment card when it is used as a social security card.

In addition, on the rear face side 12 of card main body 10, an identity information recording portion 20 is provided as shown in FIG. 9. The identity information recording portion 20 includes identity information having 144 inscribed cells 30, 30 . . . each having a depth (the second identity information) and pattern (the first identity information).

As thus described, the discernment card 1 on which identity information is recorded is given to a person or entity for whom social security number was issued as the person's or entity's social security card.

An explanation about other characters of discernment card 1 is omitted, since they are similar to those of discernment card 1 of the first embodiment as previously mentioned.

Furthermore, a transaction system in which the discernment card 1 is employed to obtain social security benefits can preferably be similar to the transaction system described in connection with the second embodiment.

Figure 10:
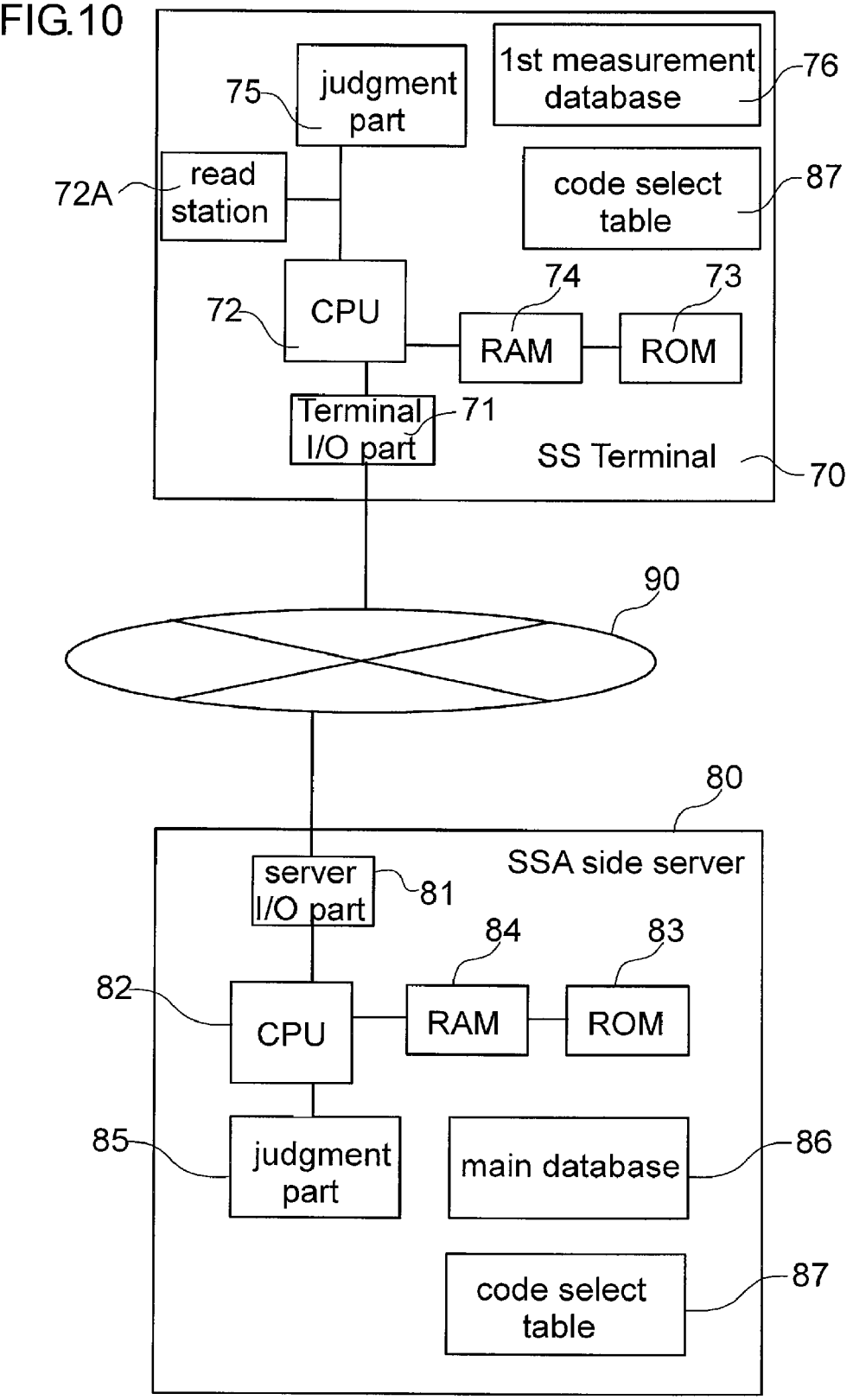
FIG. 10 is a block diagram of a system which employs a discernment card for social security purposes.

In this case, for example, as shown in FIG. 10, bank side server 80 mentioned in the second embodiment is social security station side server (SSA side server) 80, and ATM 70 is social security terminal (SS Terminal) 70.

In social security station side server 80, server I/O part 81 is used to input information, including identity information, from and output information to social security terminal 70.

In addition, social security station side server 80 comprises server I/O part 81 and a CPU 82 connected therewith.

Furthermore, social security station side server 80 includes a CPU 82, a ROM 83 which stores a program or programs, a RAM 84 which is loaded with a program or programs from the ROM 83 and which temporally stores identity information inputted and outputted, a judgment part 85 for determining identity information, a main data base 86 for recording and supervising private and other information for each identity card, and a code select table 87 for assigning any one of plural codes for transmitting identity information based on assigned groups.

In addition, the information of code select table 87 is changed frequently.

For example, it may be changed every time the code select table 87 is accessed.

In main data base 86, data associating each owner of a discernment card 1 with predetermined information is recorded.

In this case, the recorded predetermined information includes the following: the patterns (the first identity information) and depths (the second identity information) of the 144 cells allotted to the owner of the card, the group to which the card and 144 cells are assigned or belong, the patterns (the first identity information) and depths (the second identity information) of the 10 cells associated with the assigned group, and furthermore, the information required for accomplishing a social security procedure or transaction (for example, the social security number, picture, address, full name, date of birth, family history, or criminal history of the card owner and/or eligibility status of the card owner for certain benefits).

In addition, it is desirable that main data base 86 is protected from outside access via server I/O part 81 by certain defense mechanisms or procedures.

For example, main data base 86 may be set to be accessible only through social security station side server 80 by either hardware or software.

In addition, when discernment card 1 is issued to a new card owner, it is preferable that private information of the new owner be registered in main data base 86 of social security station side server 80 and that it be associated with the owner. It is also preferable that the arranged pattern of identity information of discernment card 1 being issued (the first identity information and the second identity information) also be registered with main data base 86 and be associated with the owner.

Therefore, it is not necessary to form the first identity information and the second identity information in the discernment card 1 at the time of issuance.

In other words, since private information is never recorded in discernment card 1, discernment cards 1 can be prepared with the 144 cells of specific identity information (the first identity information and the second identity information) in advance.

In social security terminal 70, terminal I/O part 71 inputs information from and outputs information, including identity information, to the social security station side server 80.

In addition, in social security terminal 70, the terminal I/O part 71 is connected to a CPU 72.

Furthermore, the social security terminal 70 includes a ROM 73 which is connected with CPU 72 and is loaded with a program or programs, a RAM 74 which is loaded with a program or programs from the ROM 73 and temporally stores identity information to be inputted and outputted, a judgment part 75 which judges identity information, a data base 76 for conducting a first measurement, a code select table 87 which is synchronized with a code select table 87 in social security station side server 80, and a read station 72A which reads identity information of identity information recording portion 20 inscribed in discernment card 1.

The read station 72A includes the aforementioned three dimension laser measuring device.

Furthermore, a monitor and a printer may be provided in the terminal 70 for receiving and displaying private information of a card owner received from social security station side server 80.

In addition, the first measuring data base 76 of social security terminal 70 stores data identifying each group and associating each group with the ten cell positions and the depths (the second identity information) and patterns (the first identity information) of the ten cell positions assigned to the group.

In addition, the data in the first measuring data base 76 is extracted from data of main data base 86 of social security station side server 80.

Therefore, when relevant data in main data base 86 is modified, the data in the first measuring data base 76 is similarly modified by transmission of the modified data from the social security station side server 80 to social security terminal 70.

In this way, the main data base 86 of social security station side server 80 and the first measuring data base of the social security terminal 70 remain synchronized.

Furthermore, when there is a modification in data of code select table 87 of social security station side server 80, it is transmitted from social security station side server 80 as initialization information to the social security terminal 70. In this way, the code select table 87 of social security terminal 70 is synchronized with code select table 87 of social security station side server 80.

In addition, generally the main data base 86 of social security station side server 80, the first measuring data base 76 and code select table 87 are not publicly accessible.

With this configuration, when the owner of discernment card 1 inserts the discernment card 1 in social security terminal 70, social security terminal 70 at first measures the depth (the second identity information) of each cell and the pattern (the first identity information) of each cell until all the 144 cells 30,30 . . . inscribed in identity information recording portion 20 of discernment card 1 are read. This is accomplished by means of the three dimension laser measuring device of read station 72A.

Furthermore, social security terminal 70 compares the measured depths (the second identity information) and patterns (the first identity information) of the corresponding ones of the 144 cells with the respective depths and patterns of the ten cells assigned to each group in the first measuring data base 76 as a first measurement. When a match is found, this specifies the group to which the card 1 belongs.

Furthermore, social security terminal 70 refers to code select table 87, and a coding method assigned to the specified group is selected.

Social security terminal 70 then codes the depth (the second identity information) and pattern (the first identity information) of each of the 144 cells in accordance with selected coding method.

Social security terminal 70 then adds information identifying the specified group and transmits the composite data to social security station side server 80.

In this regard, as a security measure for the transmitted data, code select table 87 is frequently changed. This table associates groups with coding methods, and, in particular, specified groups are keyed amongst plural coding methods.

Data is thus encoded by any one of the coding methods selected by code select table 87 which is not publicly accessible.

As a result, it becomes very difficult to determine the coding methods as to how to select the coding method from outside of the system.

Therefore, even if the transmitted data is stolen from the communication line between the social security terminal 70 and social security station side server 80, the coding method of the stolen transmitted data cannot be determined.

The social security station side server 80 receives the transmitted data from the social security terminal 70 and then the received transmitted data is inputted into server I/O 81.

The transmitted data inputted into server I/O 81 is processed by CPU 82 of social security station side server 80 carrying out the program or programs loaded from ROM 83 of social security station side server 80 into RAM 84.

In processing at social security station side server 80, at first, information of the group is first retrieved from received transmitted data.

Social security station side server 80 then refers to code select table 87, and the coding method assigned to retrieved group is determined.

The decoding method of data coded by coding method being specified is determined.

The social security station side server 80 thereafter decodes the received transmitted data in accordance with the determined decoding method and thus retrieves the identity information of the discernment card 1 (depth [the second identity information] and pattern [the first identity information] of the 144 cells).

Next, the social security station side server 80 carries out the second measurement.

In the second measurement, the decoded identity information (the arrangement pattern of depth information [the second identity information] and pattern [the first identity information] of the 144 cells) is compared with the of identity information stored in the main data base 86. The judgment part 85 then judges whether or not there is a match of the decoded identity information with the identity information stored in the main data base 86.

As the result of this, if there is any data which matches the decoded arrangement pattern of the identity information, the owner associated with the matched data is judged the owner of the discernment card 1.

Once owner of discernment card 1 is specified, central processing unit 82 of social security station side server 80 can refer to the information required for accomplishing the social security procedure or transaction (for example, social security number/photograph/address/full name/date of birth/family background, criminal history or eligibility status for certain benefits) recorded for the card owner.

The social security transaction operation after the owner of the discernment card 1 is specified is similar to that which occurs using a conventional social security card.

For example, if the discernment card 1 is used to apply for social security benefits at a social security agency, the identity of the owner of the discernment card is confirmed, as described above, and the card owner's application for benefits is thereafter processed and/or acted on by the social security agency, i.e. approved or denied.

In addition, in the present embodiment, social security station side server 80 has a judgment part 85 and social security terminal 70 has a judgment part 75 respectively. However, judgment part 85 and judgment part 75 may be hardware and/or software implemented.

A description is made of one example to employ this discernment card 1 as a social security card and actually use the same at a social security agency, or at another government agency. As mentioned herein above, the social security card, as described herein above with respect to FIGS. 8 and 9, may be used when applying for and/or receiving social security benefits at the social security or other agency. These benefits include, but are not limited to, public assistance, disability benefits, medical insurance benefits, certain licenses, such as a marriage license or a professional/occupational license, educational financial assistance and other social welfare benefits. When applying for and/or receiving such benefits, the card owner, i.e., applicant or recipient, shows the social security card to the agency personnel and provides the agency personnel with certain personal information required for the application for or receipt of social security benefits. The agency personnel then provides the card to the social security terminal 70, such as by inserting the card into the social security terminal 70, in order to confirm the identity of the card owner and to confirm the personal information provided by the card owner.

The social security terminal 70 measures depth (the second identity information) of each cell and pattern (the first identity information) of each cell of the 144 cells inscribed in the identity information recording portion 20 of the social security card and compares the measured depths and patterns of appropriate cells of the 144 cells with the respective depths and patterns of the ten cells assigned to each group in the first measuring data base 76 as the first measurement so as to specify the group to which the card belongs. The social security terminal 70 then refers to the code select table 87 to select the coding technique for the selected group and codes the depths and patterns of the 144 cells in accordance with the coding technique. Composite data produced as a result of such coding is then transmitted from the social security terminal to the social security station side server 80, which decodes this data as described herein above and retrieves the identity information of the card. The social security station side server 80 then carries out the second measurement by comparing the decoded identity information with recoded identity information stored in the main data base 86 and judges, using the judgment part 85, whether there is a match so as to specify the owner of the card.

In certain embodiments, when the owner of the card is specified in the social security station side server 80, the social security station side server 80 transmits confirmation information to the social security terminal 70 that confirms the identity of the card owner. The confirmation information transmitted to the social security terminal 70 may include certain personal information of the card owner, such as the social security number, photograph, address, full name, date of birth, family background, criminal history and/or benefits eligibility status information. Using this confirmation information, the agency personnel can confirm the identity and/or benefits eligibility of the card owner. After confirming the identity and/or benefits eligibility of the card owner, the agency personnel processes and/or acts on the card owner's application or request for social security benefits. In other embodiments, when the card owner is specified in the social security station side server 80, the social security station side server 80 transmits to the social security terminal 70 a confirmation notification indicating that the card owner has been specified, and the agency personnel is then allowed to input into the social security terminal 70 the information provided by the card owner which is necessary for applying for and/or receiving the social security benefits. The information input into the social security terminal 70 is then transmitted to the social security station side server 80 for processing of the card owner's application and/or request for the social security benefits on the server side.

In this regard, as is apparent from the above, the social security number is not mentioned as a numeral in discernment card 1 when discernment card 1 is employed as a social security card.

Even if someone sees the discernment card 1, therefore, the social security number cannot be stolen and the card cannot be employed falsely and thus abuse of social security number can be prevented.

Therefore, the longstanding problem of the illegal use of social security numbers which creates serious social and economic damages can be avoided and possibly eliminated.

Next, as the fourth embodiment, is the example of a discernment card in which personal information is recorded in the card.

Namely, since 16 kinds of specific identity information can be inscribed by means of a combination of the first identity information and the second identity information in identity information recording portion 20 of the discernment card 1 as described in the first embodiment to the third embodiment, a letter can be expressed by means of putting these 16 kinds of specific identity information together.

In such an embodiment, the constitution and effect of discernment card 1 are similar to those of the first embodiment, and the constitution and effect of the discernment card business system which employs discernment card 1 are similar to those of the second embodiment and the third embodiment, and thus are not described again. According to the fourth embodiment, a letter is expressed by means of identity information inscribed by identity information recording portion 20.

Letters which follow an ASCII (American Standard Code for Information Interchange) standard can be expressed as identity information by means of putting two 16 kinds of specific identity information together according to the ASCII code.

In addition, letters which follow a JISX0208 standard can be expressed as identity information by means of putting four 16 kinds of specific identity information together according to the JISX0208 code.

In this case, 16 kinds of specific identity information will be assigned to a hexadecimal code respectively. For example, a pattern can be assigned, as shown in FIG. 6, wherein a "vertical pattern at deep position 31*a*" corresponds with a hexadecimal "1", "vertical pattern at shallow position 31*b*" with "2", "vertical pattern at middle-depth position 31*c*" with "3", "horizontal pattern at deep position 32*a*" with "4", "horizontal pattern at shallow position 32*b*" with "5", "horizontal pattern at middle-depth position 32*c*" with "6", "left oblique pattern at deep position 33*a*" with "7", "left oblique at shallow position 33*b*" with "8", "left oblique at middle-depth position 33*c*" with "9", "right oblique pattern at deep position 34*a*" with "a", "right oblique pattern at shallow position 34*b*" with "b", "right oblique pattern at middle-depth position 34*c*" with "c", "no pattern at deep position 35*a*" with "d", "no pattern at shallow position 35*b*" with "e", "no pattern at middle-depth position 35*c*" with "f", and "no pattern and no depth cell 35*d*" with "0".

As thus described, for example, by means of what is assigned, a code of letter N is prescribed with 004e with hexadecimal when expressing 6 characters of "N, A, K, A, T, A" as the letter which followed a JISX0208 standard and a code of letter A is prescribed with 0041 with hexadecimal, a code of letter K is prescribed with 0046 with hexadecimal, because a code of letter T is hexadecimal, and is prescribed with 0054 and thus "N, A, K, A, T, A" are expressed with "004e, 0041, 0046, 0041, 0054, 0041" with hexadecimal.

And a letter of "N" is expressed by an arrangement of four pieces of specific identity information, "cell 35*d* without pattern and depth of inscription, cell 35*d* without pattern and depth of inscription, cell 32*b* having a horizontal pattern at shallow position, and cell 31*a* having a vertical pattern at deep position". In the same way, letters of "A, K, A, T, A" are expressed by four arrangements (cells) of specific identity information similarly respectively.

Similarly, letters which follow a JISX0208 standard, such as "□, □" which are a Japanese Kanji Letter are expressed with "4366, 4544" with hexadecimal. When this is expressed by specific identity information of 16 kinds, for example, it can be expressed by "horizontal pattern at deep position 32*a*, vertical pattern at middle-depth position 31*c*, horizontal pattern at middle-depth position 32*c*, horizontal pattern at middle-depth position 32*c*, horizontal pattern at deep position 32*a*, horizontal pattern at shallow position 32*b*, horizontal pattern at deep position 32*a*, horizontal pattern at deep position 32*a*" in an arrangement of 8 kinds (cells) of specific identity information.

In addition, the above hexadecimal allotment is just one example, and an allotment of hexadecimal corresponding to specific identity information of a plural number can be defined for every owner by means of bank side server 80 at random. These allotments can be recorded in a record with regard to an owner in main database 86, and a definition of an allotment of enormous number can be managed.

And, in business, an owner is specified from an arrangement of recorded identity information at a predetermined range of identity information recording portion 20 of discernment card 1. Therefore, identity information of a plural number of the owner and an allotment definition of a letter of a JISX0208 standard can be used to decode a letter from an arrangement of identity information. By means of assigning a letter to this information, the letter data is coded.

As used herein the word "entity" means a natural person, a company or any other legal or other entity with which or to whom a discernment card is to be associated. Also, the owner of the card is intended to be included in the meaning of the word "entity."

In all cases it is understood that the above-described arrangements are merely illustrative of the many possible specific embodiments which represent applications of the present invention. For example, the client system of the discernment card business system is not limited to an ATM or a social security terminal, and may comprise a transaction card reader or any other suitable reader terminal. Moreover, as stated above, the discernment card is not limited to the ATM or bank card or the social security card, and may be used as an Alien Registration Card ("green card"), for aiding the Department of Homeland Security in detecting and tracking terrorists and/or suspected terrorists and for preventing terrorist activity, all other types of ID documents, including phone cards, stored value cards, prepaid cards, passports, driver's licenses, network access cards, employee badges, security cards, visas, immigration documentation, national ID cards, citizenship cards, badges, certificates, voter registration and/or identification cards, police ID cards, border crossing cards, security clearance badges and cards, gun permits, badges, gift certificates and cards, membership cards or badges, tags, and other cards that may record information, images and/or other data, which may be associated with the entity to be identified. Numerous and varied other arrangements can be readily devised in accordance with the principles of the present invention without departing from the spirit and scope of the invention.

What is claimed is:

1. A discernment card comprising:
   a card main body integrally formed by a high strength alloy; and
   at least one identity information recording portion comprising specific identity information inscribed in the high strength alloy of the card main body,
   wherein plural cells are inscribed at predetermined positions of the identity information recording portion of the card main body and specific identity information of the identity information recording portion is specified by one or more of inscribed depth, inscribed width and inscribed shape of the cells; and
   wherein one of:
   (a) the specific identity information is specified by at least the depths of the plural cells and the specified depth of at least one cell is different from the specified depth of at least one other cell; and
   (b) the specific identity information does not include any personal information of the entity to whom the discernment card has been issued.

2. A discernment card according to claim 1, wherein the specific identity information of the identity information recording portion is specified by a combination of first identity information specified by patterns inscribed on the plural cells respectively and second identity information specified by the depths of the plural cells from the opening portion to a bottom face of the cells.

3. A discernment card according to claim 2, wherein said discernment card is issued to an entity for carrying out transactions and said discernment card is devoid of one or more of personal information of said entity and a magnetic strip normally used to contain personal information.

4. A discernment card in accordance with claim 3, wherein said entity is one of a person and a company.

5. A discernment card in accordance with claim 3, wherein said discernment card is a one or more of a credit card, bank card, debit card and any other card for carrying out a monetary transaction.

6. A discernment card in accordance with claim 5, wherein said discernment card is devoid of any magnetic strip normally used to contain personal information.

7. A discernment card in accordance with claim 3, wherein said discernment card is a social security card.

8. A discernment card according to claim 3, wherein said discernment card is devoid of a magnetic strip normally used to contain personal information.

9. A discernment card in accordance with claim 2, wherein said depth of a cell is one of a first, second, third and fourth depth, the first depth being zero depth and second, third and fourth depths each being depths greater than zero depth and of increasing depth.

10. A discernment card according to claim 9, wherein the patterns inscribed in the cells include straight line patterns with a predetermined inclination in plan view.

11. A discernment card according to claim 10, wherein the pattern inscribed in a cell is one of a blank pattern, a vertical straight line pattern, a horizontal straight line pattern, a left diagonal straight line pattern and a right diagonal straight line pattern in plan view.

12. A discernment card according to claim 11, wherein said cells are arranged in rows extending along the long side of the discernment card and one after the other along the short side of the discernment card.

13. A discernment card according to claim 12, wherein the number of rows of cells is four, each row of cells includes 36 cells and said cells are cubic in shape.

14. A discernment card according to any one of claim 1 or claim 13, wherein the high strength alloy is a titanium alloy.

15. A discernment card according to claim 14, wherein said titanium alloy is 6-4 titanium and the surface of the discernment card is coated with a metalized layer for color.

16. A method of making the discernment card in accordance with any one of claims 1-3, comprising:
    first inscribing in the identity information recording portion of the main body of the discernment card plural cells each to a specified depth to provide first identity information for each cell; and
    second inscribing in each cell a specified pattern to provide a second identity information for each cell.

17. A method in accordance with claim 16, wherein:
    said first inscribing is carried out by an electrical discharge device; and
    said second inscribing is carried out by a laser engraver.

18. A discernment card system to be used with the discernment card according to any one of claims 1-3, the discernment card system comprising:
    a client system reading specific identity information of the inscribed cells in the discernment card;
    a server system connected with the client system through a network;
    a data base provided in the server system and in which is recorded said specific identity information and personal information of the entity to whom the discernment card has been issued; and
    a judging portion provided in the server system and comparing specific identity information with the recorded information in the data base,
    wherein the client system reads the specific identity information of the inscribed cells in the discernment card and transmits the read specific identity information to the server system over the network and further the judging portion recognizes the entity to whom the card has been issued by comparing the transmitted read specific identity information transmitted by the client system over the network to the server system with the information recorded in the data base in the server system.

19. A discernment card system according to claim 18, further comprising:
    said discernment card.

20. A discernment card system according to claim 18, wherein;
    said client system is devoid of personal information;
    and said data base is publicly inaccessible.

21. A discernment card system according to claim 18, wherein
    said client system is one of an automatic teller machine and a transaction card reader;
    and said server system is a bank server.

22. A discernment card system according to claim 18, wherein:
    said client system is a social security terminal;
    and said server system is a social security system server.

23. A discernment card system according to claim 18, wherein:
    each discernment card is assigned to one of a plurality of groups and has a number of cells located at different positions, the different positions being the same positions on each discernment card of the group, and each of said number of cells on a discernment card of a group having a characteristic like that of the cell at the same position of the other discernment cards of the group;

the client system stores for each of the plurality of groups information as to the different positions of the group and the associated characteristics of the cells at the different positions;

the recorded information in the data base of the server system is associated with said plurality of groups;

the client system codes the read specific identity information with one of a plurality of coding methods selected based on the group assigned to the discernment card as determined from the read specific identity information and the stored information for each of the plurality of groups and transmits the encoded read specific identity information and the assigned group over the network;

the server system receives the transmitted encoded read specific identity information and the transmitted assigned group from the network and based on the transmitted assigned group decodes the transmitted encoded read specific identity information and carries out said comparing by comparing the decoded information with information in the data base associated with the transmitted assigned group.

24. A discernment card system according to claim 23, wherein said characteristic is inscribed depth.

25. A method of operating the discernment card system to be used with a discernment card according to any one of claims 1-3, the discernment card system comprising: a client system; a server system connected with the client system through a network; a data base provided in the server system and in which is recorded specific identity information and personal information of the entity to whom the discernment card has been issued; and a judging portion provided in the server system;

said method comprising:
  at said client system, reading the specific identity information of the inscribed cells in the discernment card and transmitting the read specific identity information over the network to the server system; and
  at said judging portion of said server system, recognizing the entity to whom the discernment card has been issued by comparing the transmitted read specific identity information transmitted by the client system over the network with the information recorded in the data base.

26. A client system for use in the discernment card system to be used with the discernment card according to any one of claims 1-3, the discernment card system comprising: a server system connected with a network; a data base provided in the server system and in which is recorded specific identity information of the discernment card and personal information of the entity to whom the discernment card has been issued; and a judging portion provided in the server system recognizing the entity to whom the discernment card has been issued by comparing read information transmitted by the client system over the network to the server system with the information recorded in the data base in the server system, said client system comprising:
  a reading unit reading specific identity information inscribed in the cells in the discernment card; and
  a transmitting unit transmitting said read specific identity information over said network to the server system.

27. A client system for use in the discernment card system according to claim 26, wherein said reading unit is a laser measuring unit.

28. A server system for use in a discernment card system to be used with the discernment card according to any one of claims 1-3, the discernment card system comprising: a client system and a network, the client system reading specific identity information of the inscribed cells in the discernment card and transmitting the read specific identity information over the network to the server system, the server system connected with the client system through the network and comprising:
  a data base provided in the server system and in which is recorded specific identity information and personal information of the entity to whom the discernment card has been issued; and
  a judging portion recognizing the entity to whom the discernment card has been issued by comparing the read specific identity information transmitted by the client system over the network to the server system with the information recorded in the data base.

29. A discernment card comprising:
  a card main body integrally formed by a high strength alloy; and
  at least one identity information recording portion comprising specific identity information inscribed in the high strength alloy of the card main body,
  wherein plural cells are inscribed at predetermined positions of the identity information recording portion of the card main body and specific identity information of the identity information recording portion is specified by a combination of first identity information specified by patterns inscribed on the plural cells respectively and second identity information specified by the depths of the plural cells, wherein the specified depth of at least one cell is different from the specified depth of at least one other cell.

30. A discernment card according to claim 29, wherein said discernment card is issued to an entity for carrying out transactions and said discernment card is devoid of one or more of personal information of said entity and a magnetic strip normally used to contain personal information.

31. A discernment card according to claim 30, wherein said high strength alloy is a titanium alloy.

* * * * *